April 29, 1958 G. FISCHER 2,832,434
TUBE FILTER INSTALLATIONS
Filed May 19, 1954 2 Sheets-Sheet 1
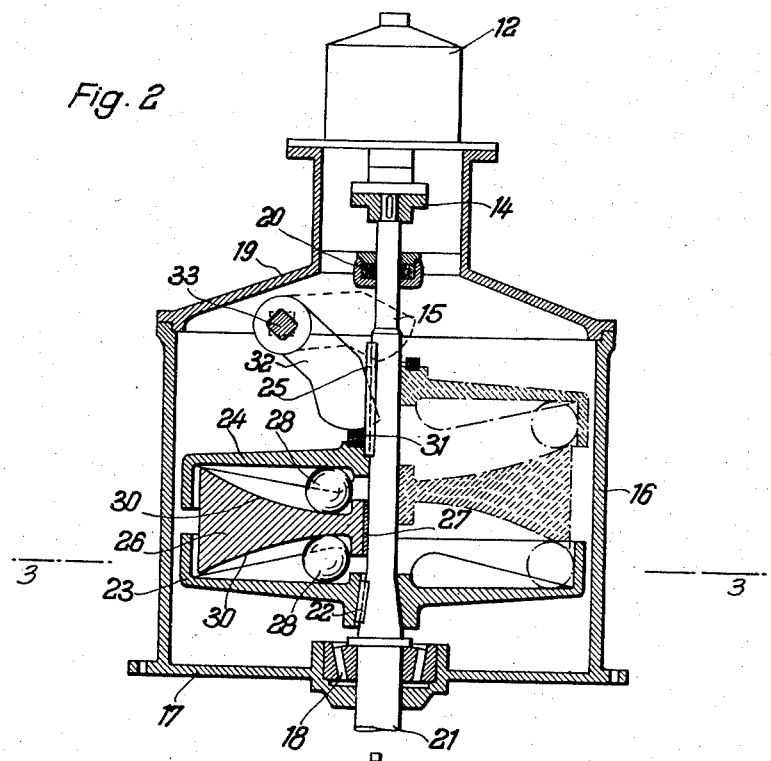
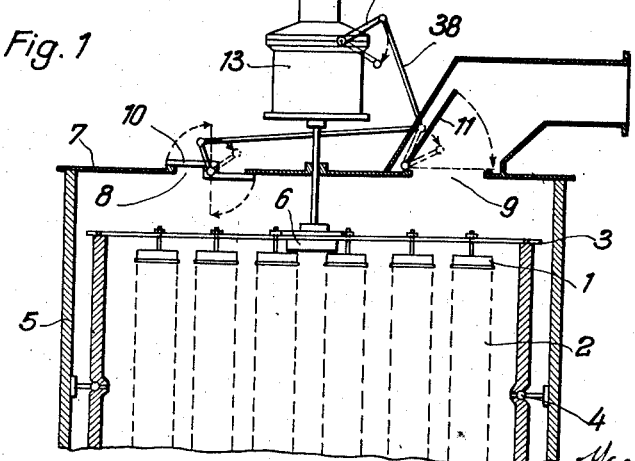
Georg Fischer
Inventor

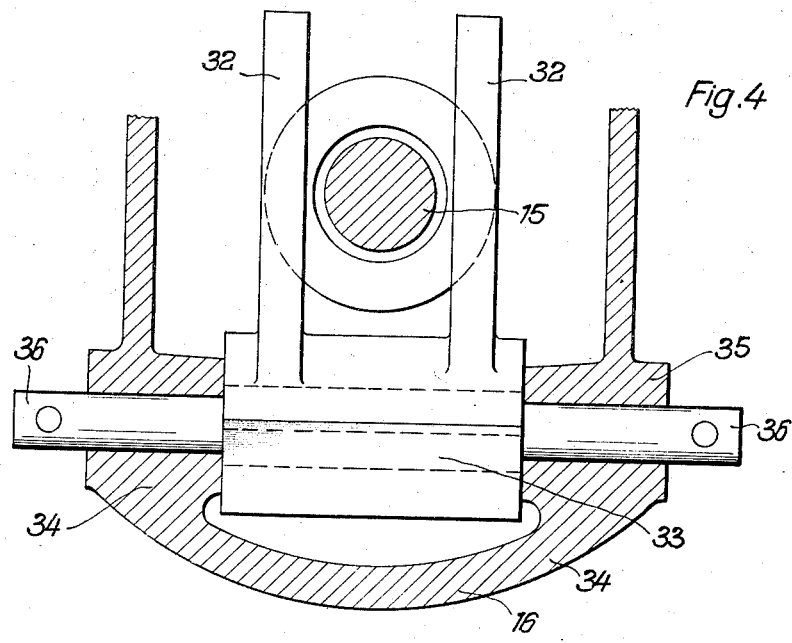
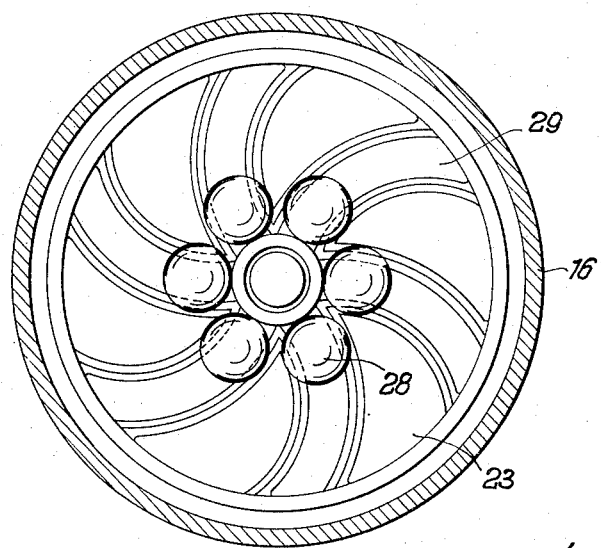

United States Patent Office 2,832,434
Patented Apr. 29, 1958

2,832,434

TUBE FILTER INSTALLATIONS

Georg Fischer, Porz (Rhine), Germany

Application May 19, 1954, Serial No. 430,785

Claims priority, application Germany May 22, 1953

3 Claims. (Cl. 183—54)

The invention relates to tube filter installations with which a change-over of air flaps, slide valves or the like is to be carried out at the commencement or conclusion of the periodically occurring filter tube cleansing and the cleansing of the tubes is effected by the rotation of a motor-driven shaft.

The purpose of the invention is to provide with such tube filter installations an arrangement which renders it possible to derive, from one and the same driving motor, both a turning movement which is necessary for cleansing the filter tubes and also the linear movements which are required for opening and closing the air valves of the filter installation at the commencement and conclusion of the cleansing periods.

In accordance with the invention, the motor-driven shaft of a tube filter installation as set forth has mounted thereon a revoluble body which is freely rotatable on the shaft and displaceable along the latter, the said body being located between two preferably disc-shaped members which are provided with annular surfaces facing one another and of which one is connected fast to the shaft and the other rotates with but is displaceable along the shaft, which members enclose the revoluble body, with the members formed with annular surfaces, wedge-shaped chambers which taper towards the periphery of the body and contain balls, and that the air valves or the like of the filter chamber to be cleaned are controlled by the axial displacements of the members displaceable on the shaft, which displacements are caused by the outwardly moving balls as a result of the centrifugal force set up during the rotation of the shaft.

According to a preferred embodiment of the invention, the preferably disc-shaped members formed with the annular surfaces have curved and preferably arcuate guide grooves which each serve to accommodate one ball and which are curved rearwardly in relation to the direction of rotation of the body, and in addition those lateral limiting surfaces of the body of revolution which face the balls are advantageously made curved in such manner that the movement of the member axially displaceable on the shaft increases with the distance of the balls from the shaft.

Furthermore, according to the invention there is provided such an arrangement and construction of the apparatus and of the linkage disposed between the latter and the air valves that the movements of the air valves are completed before the balls have produced the maximum stroke of the members which are axially displaceable on the shaft, so that a sufficient force is still exerted on the valve situated in the closed position in order reliably to hold it closed.

A further feature of the invention consists in that the device serving for the transmission of the rotational movements and the linear movements is enclosed by a preferably dust-tight housing, and this housing has arranged therein a shaft which serves for the control of the air valves or the like and which carries inside the housing a lever arm which is under the control of the longitudinally displaceable members carried on the motor-driven shaft.

One embodiment of an arrangement according to the invention is shown by way of example in the drawing, wherein:

Figure 1 shows diagrammatically the upper part of a filter chamber of a tube filter installation provided with the arrangement, Figure 2 is an axial longitudinal section on a larger scale of the arrangement shown diagrammatically in Figure 1 the valve actuating means being shown on the right hand side in dotted lines in extended position for reversing the positions of the air flap valves, Figure 3 is a horizontal section through the arrangement on the line 3—3 of Figure 2, and Figure 4 is a plan view of a part of the arrangement according to Figure 2 on an even larger scale and with the housing cover removed.

The filter tubes 2 provided at the upper end with tube covers 1 are suspended from a frame 3 which is supported so as to rock about a pivot 4 on the housing 5 of the filter chamber. Located centrally of the frame 3 is an unbalanced member or eccentric 6 which imparts circulatory vibrating movements to the frame when the said eccentric is set in rotation, these movements being transmitted to the filter tubes 2 and resulting in the cleaning of the tubes.

Located in the cover 7 of the housing of the filter chamber are two openings 8 and 9, which are each under the control of an air flap or valve 10 and 11, respectively, in place of which it is also possible to use slide valves or the like. The dust-laden air entering the tubes 2 from the bottom end passes through the walls of the filter tubes, the dust being deposited on the inside wall of the tubes and the cleansed air emerging through the pores in the tube walls. This pure air escapes during the normal operation of the filter installation through the opening 9 in the cover 7 of the filter chamber. If the pores of the tubes 2 become clogged by dust, the tubes must be cleaned in the manner set forth above by a horizontal shaking movement. In order to assist the mechanical cleaning operation, the opening 9 is closed by the flap 11 at the commencement of the shaking of the tubes, while at the same time the opening 8 which serves to admit fresh air to the filter chamber and which until then has been closed by the flap 10 is uncovered. During the admission of fresh air into the pure air side of the filter chamber, a negative pressure exists on the dust-laden air side, so that the fresh air flows in the opposite direction, i. e. from the pure air side of the filter chamber towards the dust-laden side through the walls of the tubes.

The air flaps 10 and 11 are interconnected by a linkage in such manner that when the flap 11 is closed, the flap 10 is opened, and vice versa.

The change-over of the flaps or valves 10 and 11 and also the drive of the eccentric 6 is effected by a motor 12 by means of an arrangement 13 which is hereinafter more fully explained and which forms the subject of the invention.

The motor 12 is either set in rotation periodically by means of a time relay (not shown), or it is under the control of a differential pressure gauge connected between the dust-laden air side and the pure air side of the filter chamber in a well-known manner, said gauge closing the circuit of the motor at the instant at which the filter tubes are so heavily clogged with dust that they are no longer able to filter sufficiently. In the latter case, the motor, after being switched on, is held in this position by a special relay for the time which is required for cleaning the filter tubes.

The shaft of the motor 12 is connected by way of a clutch 14 to a shaft 15 which forms a part of the arrangement 13 (Figure 1) and which extends through a housing 16 closed in dust-tight manner. The bottom 17 of this housing comprises a transverse longitudinal bearing 18 for the bottom end of the shaft 15 and the cover 19 of the housing contains a radial bearing 20 for the upper end of the shaft. The shaft 15 terminates at the bottom end in a journal 21 which projects from the housing 16 and from which the turning movement of the eccentric 6 (Figure 1) is derived.

An upwardly directed plate-like member 23, rigidly connected to the shaft 15 by a key 22, is arranged inside the housing 16. A second but downwardly facing plate-like member 24 is mounted on a keyway 25 of the shaft 15 at a certain distance from the member 23. The member 24 therefore participates in all rotational movements of the shaft, but is displaceable along the latter.

A revoluble member 26 is mounted on the shaft 15 between the two plate-like members 23 and 24 so as to be freely rotatable and also displaceable freely in the axial direction. A bushing 27 serves for the mounting of this revoluble member on the shaft 15.

The revoluble member 26 and the plate-like members 23 and 24 are so formed that chambers of wedge-shaped cross-section remain between them, said chambers serving to accommodate a number of steel balls 28. Those annular surfaces of the plate-like members 23 and 24 which are adjacent the balls are provided with guide grooves 29 (Figure 3) for the latter, and these guide grooves 29 are of arcuate form and are curved rearwardly in relation to the direction of rotation of the plates. Those surfaces 30 of the revoluble member 26 which adjoin the balls 28 are also made curved, the curvature preferably being such that their slope increases oppositely towards the periphery.

The upper plate-like member 24 carries on its upper side a thrust ball bearing 31, against which is supported a lever arm or finger 32 which is carried by a shaft 33 mounted in the housing 16. The shaft 33 is mounted in bearings 34 and 35 (Figure 4) and is provided at its ends with journals 36, 36 which serve for fitting the levers 37 (Figure 1) controlling the flaps or valves 10 and 11 through the linkage 38.

If the motor 12 is set in operation, the eccentric 6 is set in rotation by the shaft 15, said eccentric causing the horizontal shaking movement of the filter tubes 2. The rotation of the shaft 15 also results in the rotation of the plate-like members 23 and 24, so that the balls 28 are forced away from the shaft 15 under the action of centrifugal force until finally they assume positions shown in dotted lines in the right half of Figure 2. By this means, the balls lift the revoluble member 26 and the plate-like member 24, so that both members are displaced axially on the shaft 15. This axial displacement is transmitted to the lever arm 32, which consequently rocks the shaft 33 and thus controls the air flaps 10, 11 through the lever 37 and the linkage 38, i. e. the valve 11 closes and at the same time the valve 10 opens. This force effect is maintained as long as the shaft 15 is kept rotating by the motor 12, it being possible by suitable construction and arrangement of the complete system and linkage 38 to achieve the result that the movement of the valves 10, 11 is completed before the maximum travel of the members 24 and 26 is attained and accordingly sufficient force is still exerted in order reliably to hold the flap or valve 11 in the closed position. If the motor 12 is switched off, the balls 28 travel under their own weight or under the influence of an external force, for example, a spring force, acting on the linkage 38, to move automatically back towards the shaft 15 again, so that the force effect ceases, the air flap 10 is closed again and the air flap 11 is opened again.

By means of an arrangement according to the invention, it is possible with a small diameter of the members 23, 24 and 26 to produce a comparatively large travel of the plate-like member 24, which is entirely sufficient for the change-over of the air flaps or valve 10, 11. Furthermore, the encasing of the complete arrangement in a dust-tight housing has the advantage that the arrangement does not require any maintenance and lubrication and consequently is suitable for rough working without inspection.

I claim:

1. A filter having a housing forming a dust-tight filter chamber, a series of vertically disposed filter tubes in the chamber, means for suspending the tubes, gyratory means for agitating the tubes intermittently to remove entrained dust, a normally open discharge outlet from the chamber for cleaned air, a valve therefor, a normally closed fresh air inlet to the chamber, a valve therefor, coupling means between the valves to reverse their positions simultaneously, a revoluble motor mounted on the housing with a vertical shaft for actuating the gyratory means, a casing around said shaft, a lower plate fixedly keyed to the shaft within the casing, an upper plate slidably keyed to the shaft above the lower plate, an annular member slidably mounted on the shaft between said plates, and increasing in thickness from its center to the circumference, a series of balls interposed between said member and each plate and linkage from said upper plate to said valve coupling means.

2. A machine as defined in claim 1 in which the inner face of each plate has curvilinear backwardly inclined grooves arranged in pairs to receive individual balls.

3. A machine as defined in claim 1 in which the linkage from said upper plate completes the reversal of the valves prior to the maximum separation of the plates.

References Cited in the file of this patent

UNITED STATES PATENTS

| 2,443,162 | Hallock | June 8, 1948 |
| 2,464,675 | Dodge | Mar. 15, 1949 |
| 2,663,396 | Wagner | Dec. 22, 1953 |

FOREIGN PATENTS

| 351,588 | Italy | Aug. 16, 1937 |